US009917757B2

(12) United States Patent
Farrow

(10) Patent No.: US 9,917,757 B2
(45) Date of Patent: Mar. 13, 2018

(54) NETWORK CONNECTIVITY IDENTIFICATION

(71) Applicant: BRITISH TELECOMMUNICATIONS PUBLIC LIMITED COMPANY, London (GB)

(72) Inventor: Nicholas Farrow, London (GB)

(73) Assignee: BRITISH TELECOMMUNICATIONS, London (GB)

( * ) Notice: Subject to any disclaimer, the term of this patent is extended or adjusted under 35 U.S.C. 154(b) by 0 days.

(21) Appl. No.: 15/507,560

(22) PCT Filed: Aug. 19, 2015

(86) PCT No.: PCT/EP2015/069023
§ 371 (c)(1),
(2) Date: Feb. 28, 2017

(87) PCT Pub. No.: WO2016/030244
PCT Pub. Date: Mar. 3, 2016

(65) Prior Publication Data
US 2017/0288996 A1 Oct. 5, 2017

(30) Foreign Application Priority Data
Aug. 28, 2014 (EP) .................. 14250102

(51) Int. Cl.
*H04L 12/26* (2006.01)
*H04L 29/12* (2006.01)
(52) U.S. Cl.
CPC .......... *H04L 43/087* (2013.01); *H04L 43/10* (2013.01); *H04L 61/2007* (2013.01)
(58) Field of Classification Search
None
See application file for complete search history.

(56) References Cited

U.S. PATENT DOCUMENTS

| 8,437,264 B1 | 5/2013 | Go |
| 8,844,041 B1 * | 9/2014 | Kienzle .................. H04L 41/12 709/224 |

(Continued)

FOREIGN PATENT DOCUMENTS

EP 1 662 705 5/2006

OTHER PUBLICATIONS

Wei, et al., "Classification of access network types", Computer Networks, Ethernet wireless LAN, ADSL, cable modem or dialup? vol. 52, Issue 17, ISSN: 1389-1286, Dec. 8, 2008, (14 pages).

(Continued)

*Primary Examiner* — Mohammad Adhami
(74) *Attorney, Agent, or Firm* — Nixon & Vanderhye P.C.

(57) ABSTRACT

Examples of the present invention present a method of determining the network connectivity technology being used in a network link. The method sends test packets from the router to an end device, such as a set-top box, and measures the latency in the received packets at the end device. The packets are gradually increased in size. The increasing packet size effectively results in increasing the load on the network link between the router and the end device. The latency characteristics vary as a function of packet size (representing increasing network load), and result in a signature or "fingerprint" for the network connectivity technology being used for the link, across the load cycle. The signature can be compared to predetermined models to identify the specific technology used. The technique can be enabled using software modules installed at the gateway/router and at the end-point, such as a set-top box.

7 Claims, 7 Drawing Sheets

(56) References Cited

U.S. PATENT DOCUMENTS

| | | | | |
|---|---|---|---|---|
| 9,769,615 B2* | 9/2017 | Fix | ............... | H04W 4/023 |
| 2002/0186660 A1* | 12/2002 | Bahadiroglu | ........... | H04L 29/06 |
| | | | | 370/248 |
| 2003/0200294 A1* | 10/2003 | Thorpe | ............ | H04L 41/00 |
| | | | | 709/223 |
| 2006/0182039 A1* | 8/2006 | Jourdain | ............ | H04L 47/10 |
| | | | | 370/252 |
| 2007/0176741 A1* | 8/2007 | Montenegro | ......... | H04L 63/107 |
| | | | | 340/5.83 |
| 2011/0044199 A1* | 2/2011 | Kazmi | ............ | H04L 43/0864 |
| | | | | 370/252 |
| 2011/0314269 A1* | 12/2011 | Stavrou | ............ | G06F 21/6209 |
| | | | | 713/150 |
| 2015/0024743 A1* | 1/2015 | Zheng | ............ | H04W 48/16 |
| | | | | 455/434 |

OTHER PUBLICATIONS

Rocha, et al., "An End-to-End Technique to Estimate the Transmission Rate of an IEEE 802.11 WLAN", Federal University of Rio de Janeiro, Brazil, Jun. 1, 2007 (6 pages).

Sinha, et al., "Fingerprinting Internet Paths using Packet Pair Dispersion", USC Computer Science Technical Report No. 06876 (15 pages), date unknown.

Uluagac, et al., "A Passive Technique for Fingerprinting Wireless Devices with Wired-side Observations", 2013 IEEE Conference on Communications and Network Security (CNS) (9 pages).

International Search Report for PCT/EP2015/069023, dated Nov. 4, 2015, 3 pages.

\* cited by examiner

NETWORK CONNECTIVITY IDENTIFICATION

This application is the U.S. national phase of International Application No. PCT/EP2015/069023 filed 19 Aug. 2015, which designated the U.S. and claims priority to EP Patent Application No. 14250102.2 filed 28 Aug. 2014, the entire contents of each of which are hereby incorporated by reference.

FIELD OF THE INVENTION

This invention relates to the field of identifying network connectivity type.

BACKGROUND TO THE INVENTION

The usage of home network technologies can vary significantly between and within customer premises. This variation can cause difficulties for a service provider trying to troubleshoot faults or determine the available connectivity. If a customer reports that his IPTV service is not working properly for example, then it is useful to know what type of network is being used from the gateway or router to the set-top box and its performance, in case the problem is related to an issue in the home network. However, a DSL service provider does not usually have any visibility of the home network performance beyond the gateway or router.

This problem is further complicated by the ever increasing number of network connectivity technologies that a customer might use, including Ethernet, 2.4 GHz Wi-Fi, 5 GHz Wi-Fi, Powerline networking, and hybrid devices that incorporate several of these technologies in the same unit. Performance, and in particular throughput, of each of these technologies can vary significantly (over time) as well, making attempts to identify the technology based on throughput alone difficult.

Simply measuring the bandwidth or throughput of the link is not helpful. FIG. 1 shows the exemplary bandwidth performance of a 5 GHz Wi-Fi link to an IPTV terminal over a 24 hour period. As can be seen, the bandwidth fluctuates dramatically over the course of the period, and thus cannot be used to accurately identify the technology being used.

"A Passive Technique for Fingerprinting Wireless Devices with Wired-side Observations" by Selcuk Uluagac et al., IEEE Conference 2013 on Communications and Network Security, 14-16 Oct. 2013, describes the use of statistical techniques to create unique, reproducible device and device type signatures that represent time varying behaviour in network traffic. Artificial neural networks (ANNs) are used to classify devices and device types.

"Fingerprinting Internet Paths using Packet Pair Dispersion" by Rishi Sinha et al, USC Computer Science Technical Report No. 06-876, describes an approach to Internet path fingerprinting based on the distribution of end-to-end packet-pair measurements. Path fingerprinting is a component of applications that distinguish among different network paths, including path selection in overlay networks, multipath routing and monitoring and diagnosis of network problems.

"Classification of access network types: Ethernet, wireless LAN, ADSL, cable modem or dialup?", by Wei W et al, Computer Networks Vol 52, no 17, 8 Dec. 2008, pages 3205-3217 describes a scheme to classify access networks into three categories: Ethernet, wireless LAN and low-bandwidth connection. The scheme is based on intrinsic characteristics of the various access networks, and utilizes the median and entropy of a packet-pair inter arrival times.

"And End-to-End Technique to Estimate the Transmission Rate of an IEEE 802.11 WLAN" by Rocha A A et al, Proceedings of the 2007 IEEE International Conference on Communications, pages 415-42, XP031125708, describes an active measurement technique to infer the bit rate of an IEEE802.11 device. The proposed method is based both on a recently proposed technique to infer the type of access network and on the packet pair approach, but adapted to take into account the overhead caused by the IEEE802.11 control and the existence of concurrent WLAN traffic.

European patent EP1662705 describes a method and apparatus for estimating the available bandwidth on a packet network. By approximating a packet network, such as the internet, by an M/M/1 queuing model, the available bandwidth of the network can be determined from the variance of the distribution of the sojourn times of packets transmitted through the network.

U.S. Pat. No. 8,437,264 describes measuring the speed of a link. An initial packet train having an initial length over the link is sent. A speed result is determined based at least in part on an actual time of reception of individual packets in the packet train. The quality of the speed result for the initial packet train is evaluated according to a constraint. A determination is made as to whether to send a subsequent packet train based at least in part on the quality of the speed result.

SUMMARY OF THE INVENTION

According to one aspect of the present invention, there is provided a method of identifying a data transmission technology used in a network link between a first node and a second node, said method comprising:

transmitting a first set of data packets from the first node to the second node over the network link, and receiving the first set of data packets at the second node, wherein the first set of data packets comprises a plurality of data packets of a first size, and the plurality of data packets are transmitted with a fixed transmitted inter-packet gap;

calculating latency values associated with the first set of data packets, wherein each latency value is equal to the difference in the received inter-packet gap of the data packet and the fixed transmitted inter-packet gap;

repeating the transmitting and calculating steps with a second set of packets, wherein the second set of data packets comprises a plurality of data packets of a second size, and wherein the second size is different to the first size;

generating a fingerprint for the network link comprising a distribution of latency values for each packet size;

comparing the generated fingerprint with a plurality of predetermined fingerprints to determine the data transmission technology used in the network link, wherein each predetermined fingerprint corresponds to data transmission technology type.

By repeating the method with different packet sizes, the load on the network link is effectively varied. The resulting distribution of latency values for each packet size (or loading), results in a fingerprint or signature for the network link. The resulting signature is compared to predetermined signatures in order to identify the network connectivity technology used in the network link. Certain network connectivity technologies will exhibit certain characteristics in the distribution of latency values.

The latency values can be grouped into latency bins, where each latency bin covers a range of latency values, and the fingerprint comprises a distribution of latency values grouped into latency bins for each packet size.

In practice, the method is repeated with a large number, or plurality, of sets of packets, where each set comprises data packets of a size different to a previously used size. The result is a large number of sets of packets covering different packet sizes, resulting in a varied load on the network link. The plurality of sets of packets may increase in packet size starting from the first set.

The number of sets of packets used may be dependent on a dispersion measure associated with the network link, where the dispersion measure of the overall load on a link.

The comparing step may comprise using pattern matching techniques.

According to a second aspect of the invention, there is provided a system for identifying a data transmission technology used in a network link between a transmitting node and a receiving node, said system comprising:

a transmitting node adapted to transmit a first set of data packets to a receiving node over a network link, wherein the first set of data packets comprises a plurality of data packets of a first size, and the plurality of data packets are transmitted with a fixed transmitted inter-packet gap;

a receiving mode adapted to receive the first set of data packets;

a control module adapted to calculate latency values associated with the first set of data packets, wherein each latency value is equal to the difference in the received inter-packet gap of the data packet and the fixed transmitted inter-packet gap; and wherein the transmitting node is further adapted to transmit a second set of packets, wherein the second set of data packets comprises a plurality of data packets of a second size, and wherein the second size is different to the first size; and the control module is further adapted to a calculate latency values associated with the second set of data packets, generate a fingerprint for the network link comprising a distribution of latency values for each packet size, and compare the generated fingerprint with a plurality of predetermined fingerprints to determine the data transmission technology used in the network link, wherein each predetermined fingerprint corresponds to data transmission technology type.

According to a further aspect of the invention, there is provided a method of identifying a data transmission technology used in a network link between a first node and a second node, said method comprising:

calculating latency values associated with data packets transmitted from the first node to the second node over the network link, where each latency value is equal to the difference in the received inter-packet gap of a data packet and the fixed inter-packet gap, and wherein a plurality of data packets are transmitted in a plurality of sets of data packets with each set covering a different packet size from other sets;

generating a fingerprint for the network link comprising a distribution of latency values at each packet size;

comparing the generated fingerprint with a plurality of predetermined fingerprints to determine the data transmission technology used in the network link, wherein each predetermined fingerprint corresponds to data transmission technology type.

This method covers the operation of a control module used to identify the data transmission technology used in the network link.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention present a method of determining the network connectivity technology being used in a network link. The method sends test packets from the router to an end device, such as a set-top box, and measures the latency in the received packets at the end device. The packets are gradually increased in size. The increasing packet size effectively results in increasing the load on the network link between the router and the end device. The latency characteristics vary as a function of packet size (representing increasing network load), and result in a signature or "fingerprint" for the network connectivity technology being used for the link, across the load cycle. The signature can be compared to predetermined models to identify the specific technology used. The technique can be enabled using software modules installed at the gateway/router and at the end-point, such as a set-top box.

Figure 1:
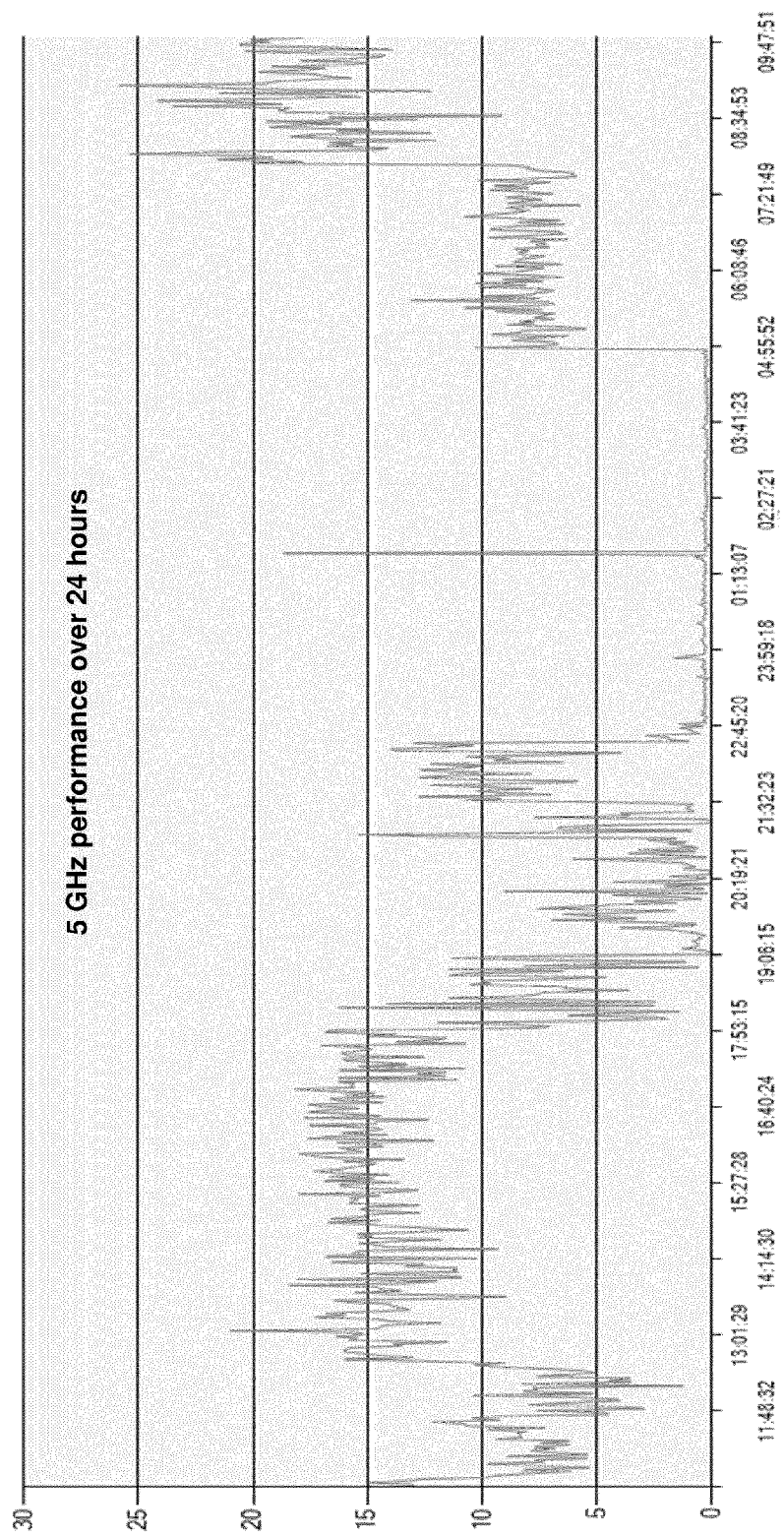
FIG. 1 is a plot of the bandwidth performance of a 5 GHz WiFi link over a 24 hour period.
Figure 2:
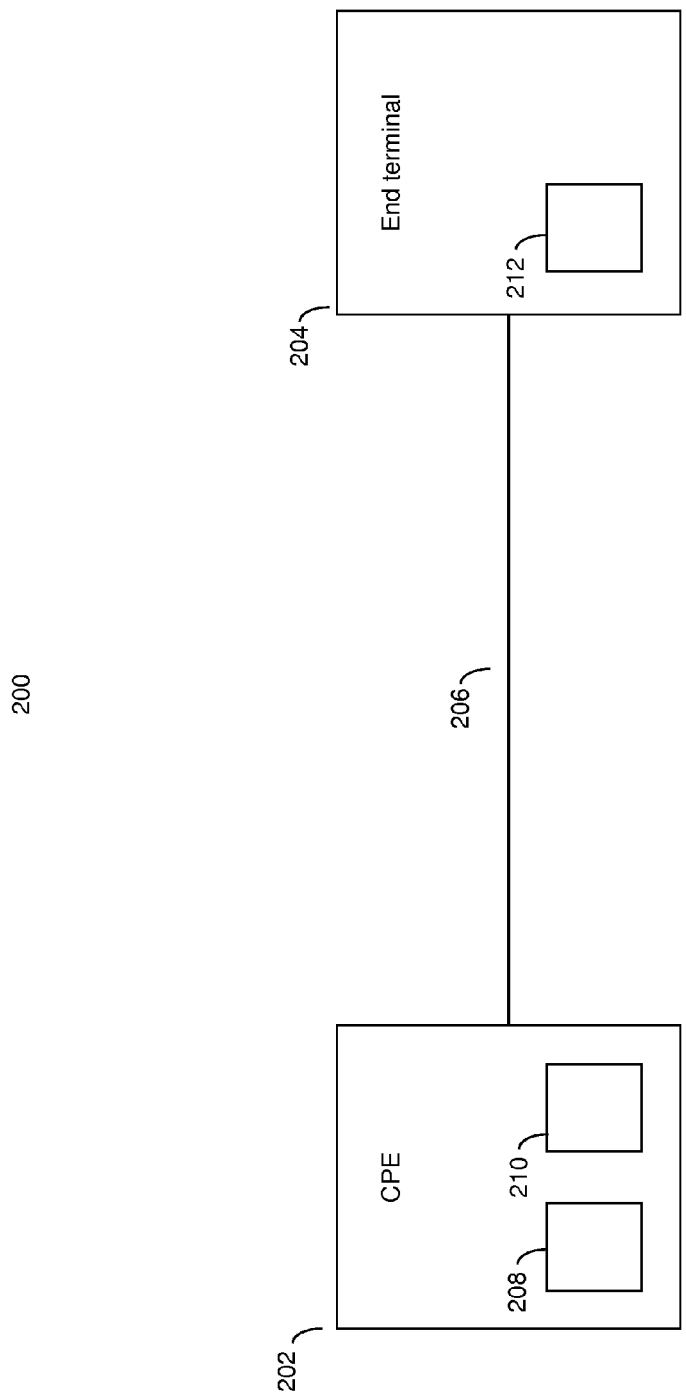
FIG. 2 is a system diagram of network in an example of the present invention.

FIG. 2 shows a home network 200, comprising a customer premises equipment CPE 202 connected to an end terminal 204 over a network link 206. In this example, the CPE 202 is a DSL gateway or hub, and the end terminal 204 is an IPTV set-top box. The network link 206 connecting the CPE 202 and the end terminal 204 can utilise various network connectivity technologies. Examples of network connectivity technologies that can be used include Ethernet, 2.4 GHz Wi-Fi, 5 GHz Wi-Fi, and power-line communication technology (as set out by the HomePlug PowerLine Alliance). The invention aims to identify the network connectivity technology used on the network link 206. This exercise is complicated by the increasing use of hybrid devices that utilise Wi-Fi and power-line together in the same device, and dynamic link management to route network traffic.

The CPE 202 comprises a control module 208 and a transmitter unit 210. The end terminal 204 comprises a receiver unit 212. The control module 208 is connected to the transmitter unit 210, and is further connected to the receiver unit 212 over the network link 206. The transmitter unit 210 operates in conjunction with a network interface card (not shown) in the CPE 202, to send data packets from the CPE 202 to the end terminal 204 over the network link 206 in accordance with the invention. The receiver unit 212 operates in conjunction with a network interface card (not shown) at the end terminal 204 to receive the data packets sent by the CPE 202 over the network link 206, and performs analysis in accordance with the invention. However, for simplicity, references to the network interface cards have been omitted in this description. The network link 206, and associated network connectivity technology, is connected to the network interface card either directly or via a suitable high speed link/bus.

The control module 208, transmitter unit 210, and receiver unit 212 are implemented as software modules, or software stubs. These stubs can be incorporated into the firmware of the respective devices.

Figure 3:
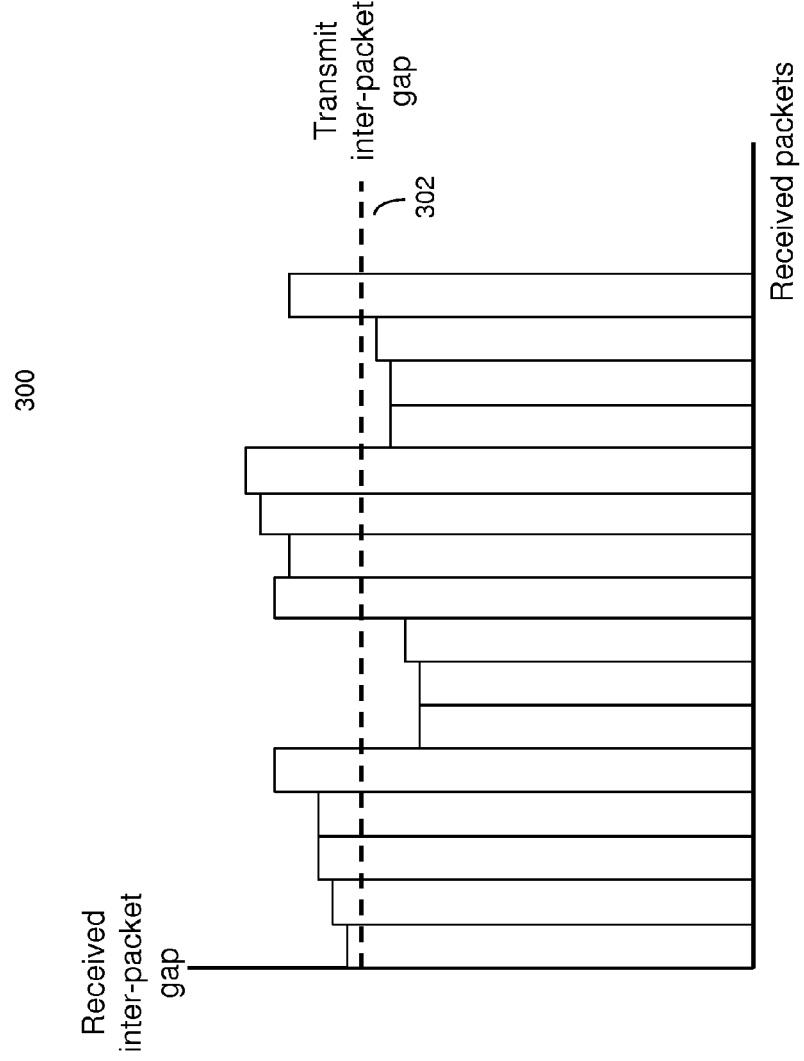
FIG. 3 is a plot of the received inter-packet gap of a sequence of packets in an example of the present invention.

Trains or sequences of test data packets are generated and transmitted by the transmitter unit 210 and carried over the network link 206 to the end terminal 204. In this example, each train is made up of 100 packets of a fixed size (initially set to 50 bytes), and transmitted with a fixed time gap between each successive packet, also referred to as the inter-packet gap, of 100 µs. The receiver unit 212 measures the inter-packet gap of the received data packets, which is measured as the difference in the receive times of successive data packets. Delays in the network link 206 can cause the inter-packet gap for some of the received packets to be greater than the inter-packet gap for the transmitted packets. A person skilled in the art will also appreciate that certain conditions can also cause the inter-packet gap for some received packets to be less than that for the transmitted packets. For example, if a send buffer holds consecutive packets and then transmits them at the same time with a minimal delay between the packets. FIG. 3 shows a plot of the received inter-packet gap of a sequence of packets, with a line marking the inter-packet gap of the transmitted packets.

The difference in the received inter-packet gap and the transmitted inter-packet gap is referred to as the latency. A positive latency occurs when the received inter-packet gap is greater than the transmitted inter-packet gap, and a negative latency is when the received inter-packet gap is less than the transmitted inter-packet gap.

Once a test sequence has been sent with one packet size, further test sequences can be sent, each with different (typically increasing) packet sizes. For example, a further test sequence of 100 packets of packet size 100 bytes can be sent, also with the same 100 µs inter-packet gap, and the inter-packet gap for the received packets measured. This is then repeated for increasing packet sizes up to some upper limit, say around 1400 bytes (for Ethernet systems, but this limit will depend on the maximum transmit unit size of the network link layer).

The increase in packet size in the test sequences effectively increases the load on the network link 206. The distribution of measured latency values for each packet size (or loading), results in a fingerprint or signature for the network link 206. The invention aims to determine this signature, and compare it to predetermined signatures in order to identify the network connectivity technology used in the network link 206. Certain network connectivity technologies will exhibit certain characteristics in the distribution of latency values as a function of load, as the underlying technology adapts to the loading. One approach taken to help analyse the distribution of latency values is to aggregate the measured latency values into latency bins or buckets, with each bin covering a range of latency values.

Figure 4:
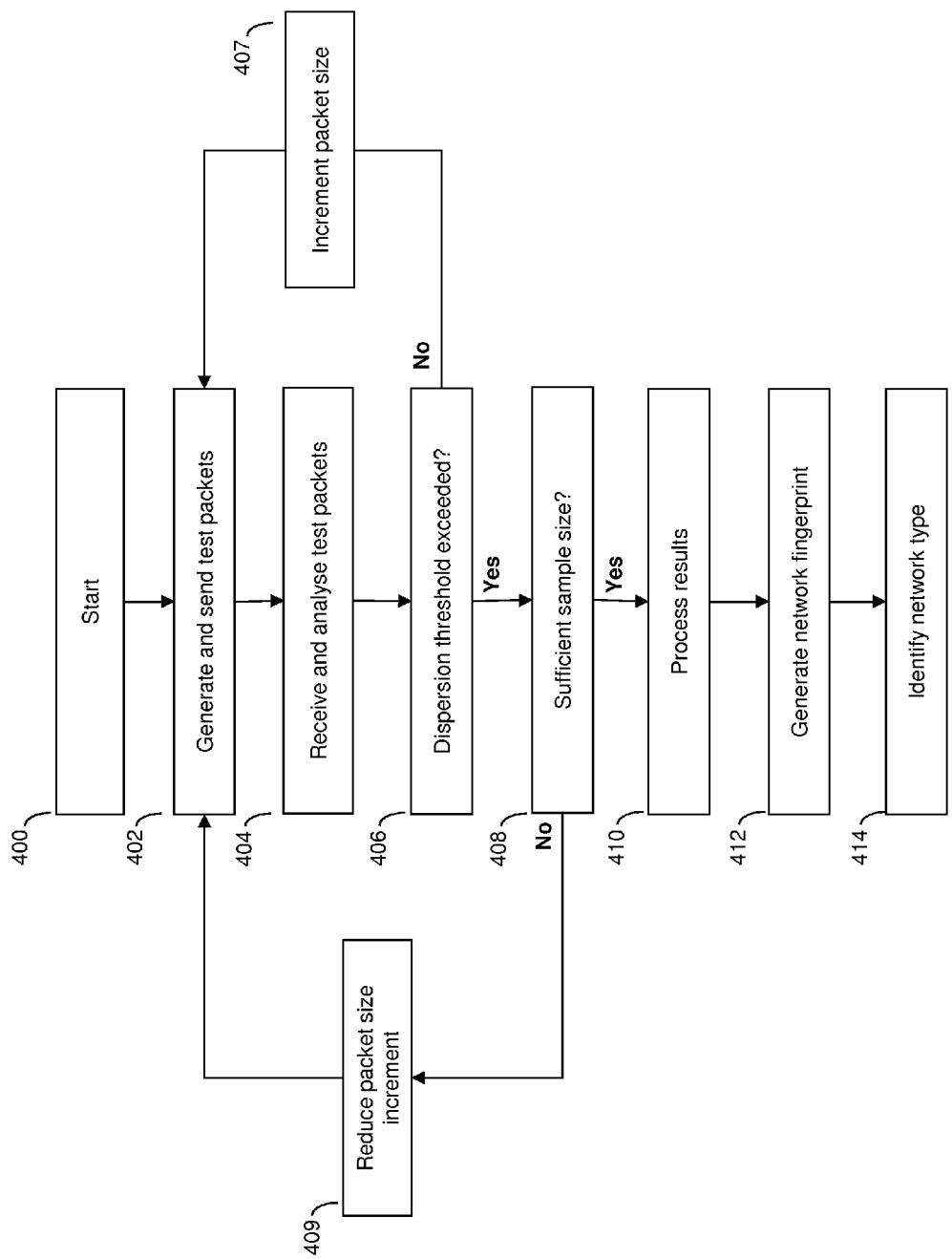
FIG. 4 is a flow chart illustrating the steps of an example of the invention.

An example of the invention will now be described in more detail with reference to the flow chart of FIG. 4. This chart outlines the basic invention concepts.

Processing starts at step 400, with system defaults loaded, which include the start packet size for the test sequences, the inter-packet gap for transmitted packets, the minimum sample size, and the packet increment size. In this example, the start packet size is set to 50 bytes, the transmitted inter-packet gap to 100 µs, the minimum sample size set to 25, and packet increment size is 50 bytes. Furthermore, a dispersion threshold is set. The dispersion threshold will be discussed in more detail below. In this example, it is set to 40%, which is used to represent a fully loaded network.

In step 402, the transmitter unit 210 generates a sequence of test packets. Each packet in the sequence is set to the start packet size of 50 bytes, and the packets are transmitted by the transmitter unit 210 to the receiver unit 212 over the network link 206, with a fixed inter-packet gap of 100 µs between each transmitted packet. A variable inter-packet gap could be used for transmitted packets, though the resulting calculations will be more complex, and further a fixed gap of 100 µs has been found to give good results. Several sequences can be transmitted using the same packet size to obtain more accurate results on unstable links. Furthermore, additional data packets can be sent before this sequence for the purposes of detecting cross traffic, as will be described below.

In step 404, the packets are received at the receiver unit 212, where they are analysed. Specifically, the receive inter-packet gap is measured as the difference in the receive times of successive receive data packets. The results are sent back by the receiver unit 212 to the control module 208 over the network link 206.

The control module 208 can also determine whether there is any "cross traffic" on the network link 206 when the test sequence was being transmitted, which is to say whether there are other packets being sent over the network link 206 as well as the test sequence. If a significant amount of cross traffic is present, the characterisation of the network link will be skewed. One way to detect and avoid cross traffic is to use two single data packets transmitted at defined intervals before the main test sequence (50 and 100 ms before the first data packet in step 402). The jitter on the reception of these will pick up the presence of cross traffic. If there is no cross traffic, the 50 ms and 100 ms injected packets should arrive with roughly those delays. If there is significant change in jitter between the 100 ms and 50 ms packet and or the 50 ms and the first packet in the test sequence, then this indicates cross traffic. In a prototype system, 10% jitter represents the presence of cross traffic. If cross traffic is detected, then step 402 is repeated.

In step 406, a check is made by the control unit 208 to determine if the dispersion threshold has been reached. The dispersion is used as a relative measure of the overall load on a link, and is calculated as the difference in the total time taken to receive the test sequence and the total time taken to transmit the test sequence, divided by the time taken to send the sequence, and expressed as a percentage:

$$\text{dispersion} = \frac{T_{rx} - T_{tx}}{T_{tx}} \times 100$$

Where $T_{tx}$ is the total time taken to transmit the entire test sequence, and $T_{rx}$ is the total time taken to receive the entire test sequence.

The dispersion is a useful measure of the loading on the network link. In this example, a dispersion threshold is set to 40% in step 400, which is indicative of a fully loaded network. A lower dispersion is indicative of lower loading on the network. The dispersion is a relative measure, and thus allows the method to abstract away from hard performance figures like throughput/bandwidth. For instance, a generally slow network link may reach 40% dispersion when the throughput is at 15 Mbps, whereas a fast network link may not reach 40% dispersion until above 100 Mbps.

The check at step 406 is to determine if the dispersion for the last test sequence exceeded the dispersion threshold of 40%. If the dispersion threshold has not been exceeded, then processing passes to step 407, and an increment is made to the next packet size by the control module 208 using the packet increment size from step 400.

After incrementing the packet size, processing passes back to step 402, where a further test sequence is generated and sent, and steps 404 and 406 repeated until the dispersion threshold has been reached.

If at step 406 it is determined that the dispersion threshold has been reached, then processing passes to step 408, where a check is made on the sample size.

In step 408, the control module 208 performs a check to see if the sample size is sufficient, by checking the number of different packet sizes used so far against the minimum sample size. If the number of samples is insufficient, i.e. less than the minimum sample size, then processing passes to step 409, where the packet increment size is reduced, and the process steps back to step 402. This has the effect of increasing the number of samples. Getting a sufficient sample size is important, to obtain detailed view of the load cycle. To illustrate, if we started with test packets at 50 bytes, and the network link becomes fully loaded with the subsequent packet size of 100 bytes according to our dispersion measure, then we would only have 2 load samples giving an incomplete view of the load cycle. Thus, a minimum sample size is set, here at 25. A larger number of samples can be used, and will result a higher-definition fingerprint, but may not be required to differentiate between technologies. Thus, in this example, a minimum sample size of 25 is used.

If the sample size is sufficient, processing passes to step 410.

In step 410, the control module 208 processes the results, where latency values are calculated for the packets in each sequence. The latency value associated with a packet is equal to the difference in receive inter-packet gap and the transmit inter-packet gap:

$$latency = rx\_interpacket\_gap - tx\_interpacket\_gap$$

where rx_interpacket_gap is the receive inter-packet gap and measured as the difference in the receive times of successive receive data packets, and tx_interpacket_gap is the transmit inter-packet gap, which in this example is fixed.

For example, if the transmit inter-packet gap is 100 μs, and the receive inter-packet gap of is 180 μs, then the latency for that packet is +80 μs. If the receive inter-packet gap is 74 μs, then the latency for that packet is −30 μs.

Thus, for a train of 100 packets, there will be 99 resulting latency values, as the latency values are measured as a difference between two successive data packets—the inter-packet gap. Latency bins are used to help process the results. Each latency bin covers a range of latency values. In this example, the following latency bins are used: −100 μs, −90 μs, −80 μs, −40 μs, −20 μs, −10 μs, 0, 10 μs, 20 μs, 40 μs, 80 μs, 100 μs, 110 μs, 200 μs, 500 μs, 1000 μs, 2000 μs, 4000 μs, 8000 μs, and 16000 μs. Each bin covers a range starting from greater than the lower bin and includes everything up to the bin value itself. For example, the −80 μs bin covers the range >−90 μs and up to anything equal to −80 μs. However, the specific bins and their ranges are not critical, as long as they are used consistently for fingerprint generation and matching. Indeed, grouping results into bins is also optional as individual latency values could be retained and used for comparison later instead. However, grouping into bins is a more efficient approach.

In step 412, for each packet, a count is incremented for the latency bin that represents the latency value of that packet. This is repeated for all the packet trains for all packet sizes. The result is a latency distribution, or distribution of latency values, grouped into bins, and repeated for each packet size. The distribution gives an indication of how the underlying network link 106 has performed/adapted under a complete load cycle (low to high), and is referred to a "fingerprint" or "signature".

Figure 5:
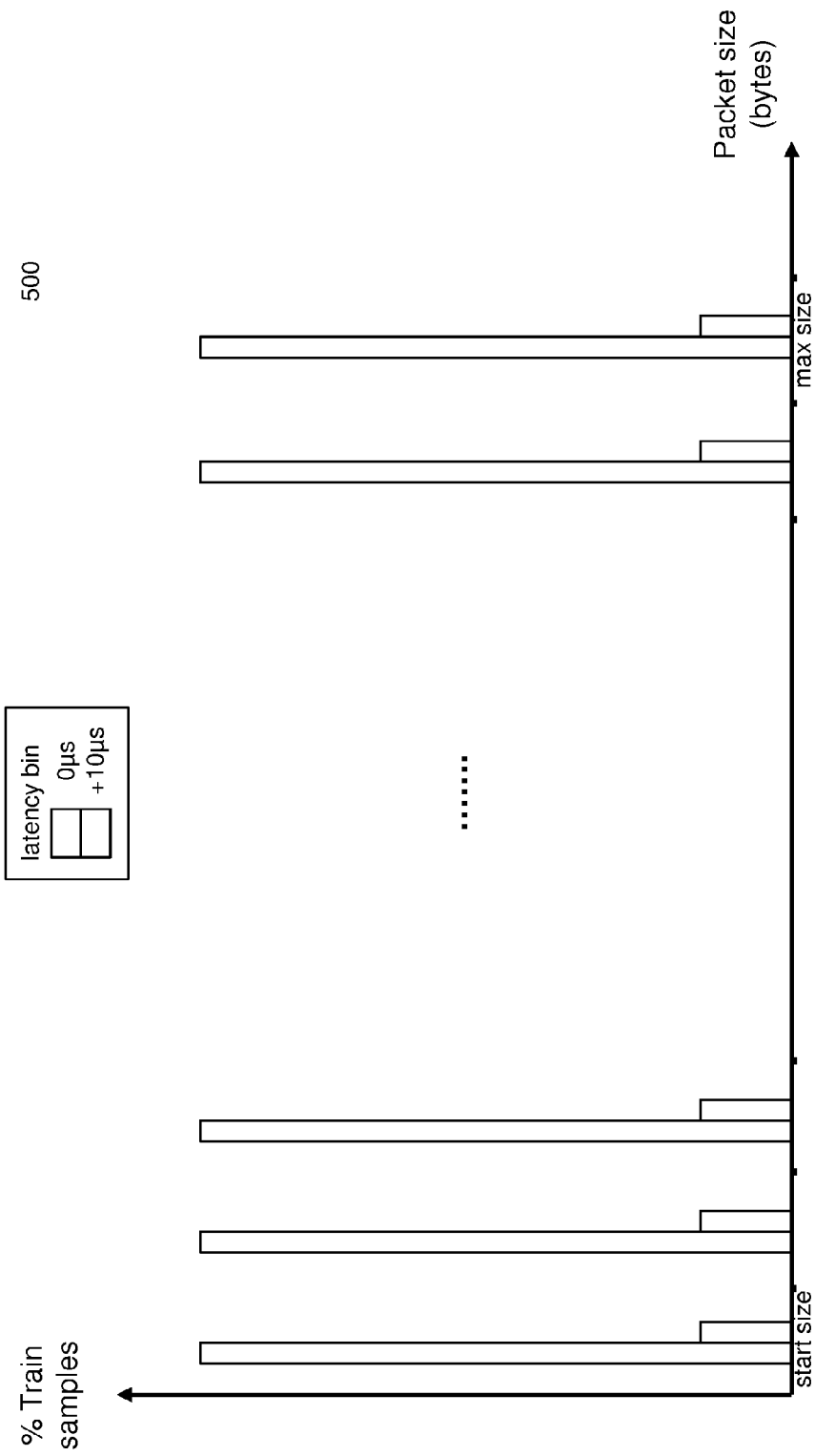
FIG. 5 is a plot of the latency distribution for various packet sizes for an example Ethernet link.

FIG. 5 illustrates the fingerprint 500 for an Ethernet network link. Other ways of visualising the distribution can be used. Here, the distribution has been simplified for the sake of clarity, with only 2 of the frequency bins shown. Most of the hits are in the 0 μs bin for all the packet sizes, which is typical for an Ethernet link, where there is no adaptation based on network load.

Figure 6:
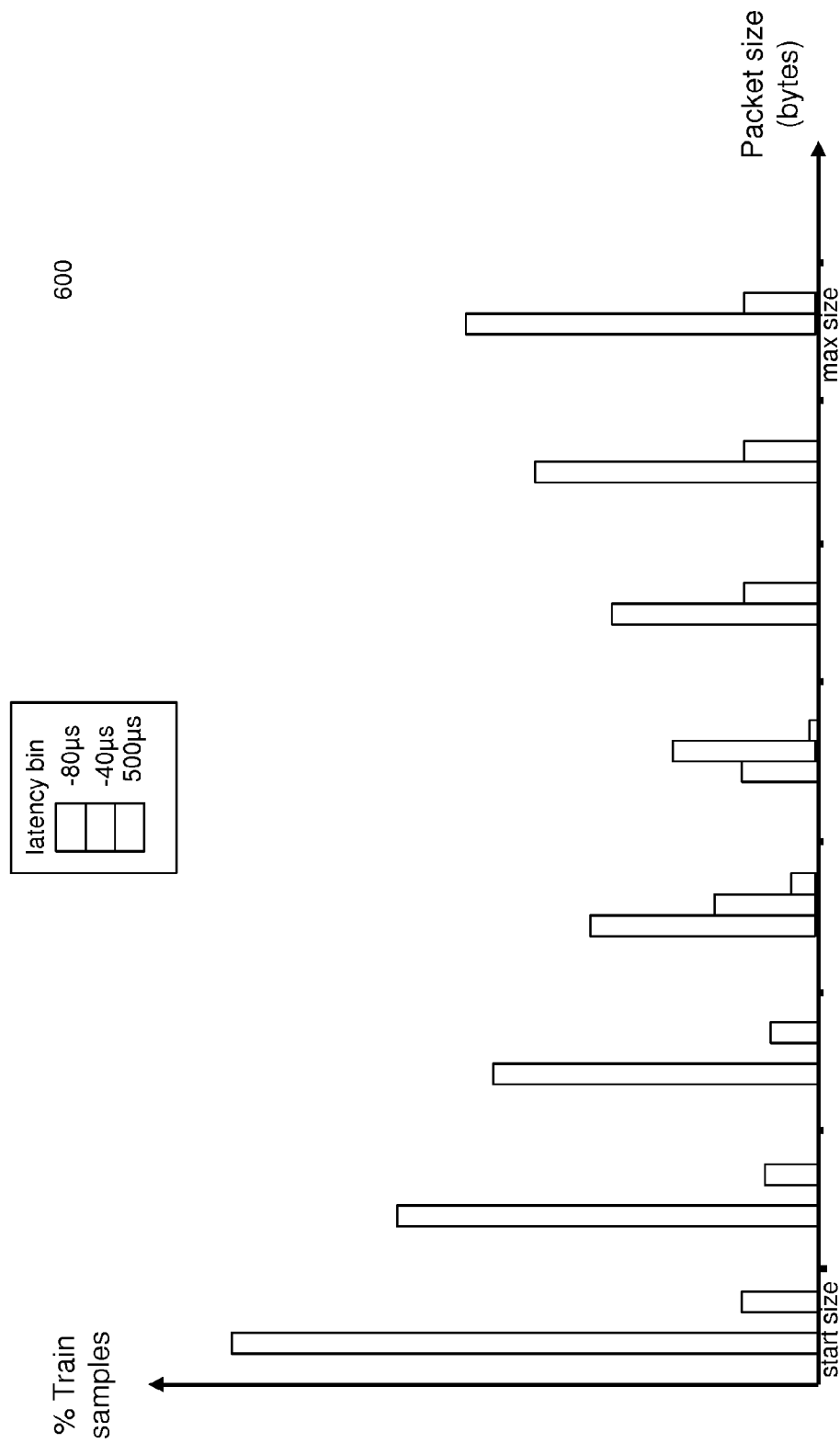
FIG. 6 is a plot of the latency distribution for various packet sizes for an example 5 GHz Wi-Fi link.

FIG. 6 illustrates the fingerprint for a 5 GHz Wi-Fi network link. Again, the distribution here has been simplified for the sake of clarity, with only three bins shown, and therefore the bin illustrated do not total 100%. The key characteristic of this distribution is the migration of hits from the −80 μs bin to the −40 μs bin as the load increases, and with a small representation of 500 μs across all loads. It is clear this distribution is very different over the loading range compared to the Ethernet link in FIG. 5.

Figure 7:
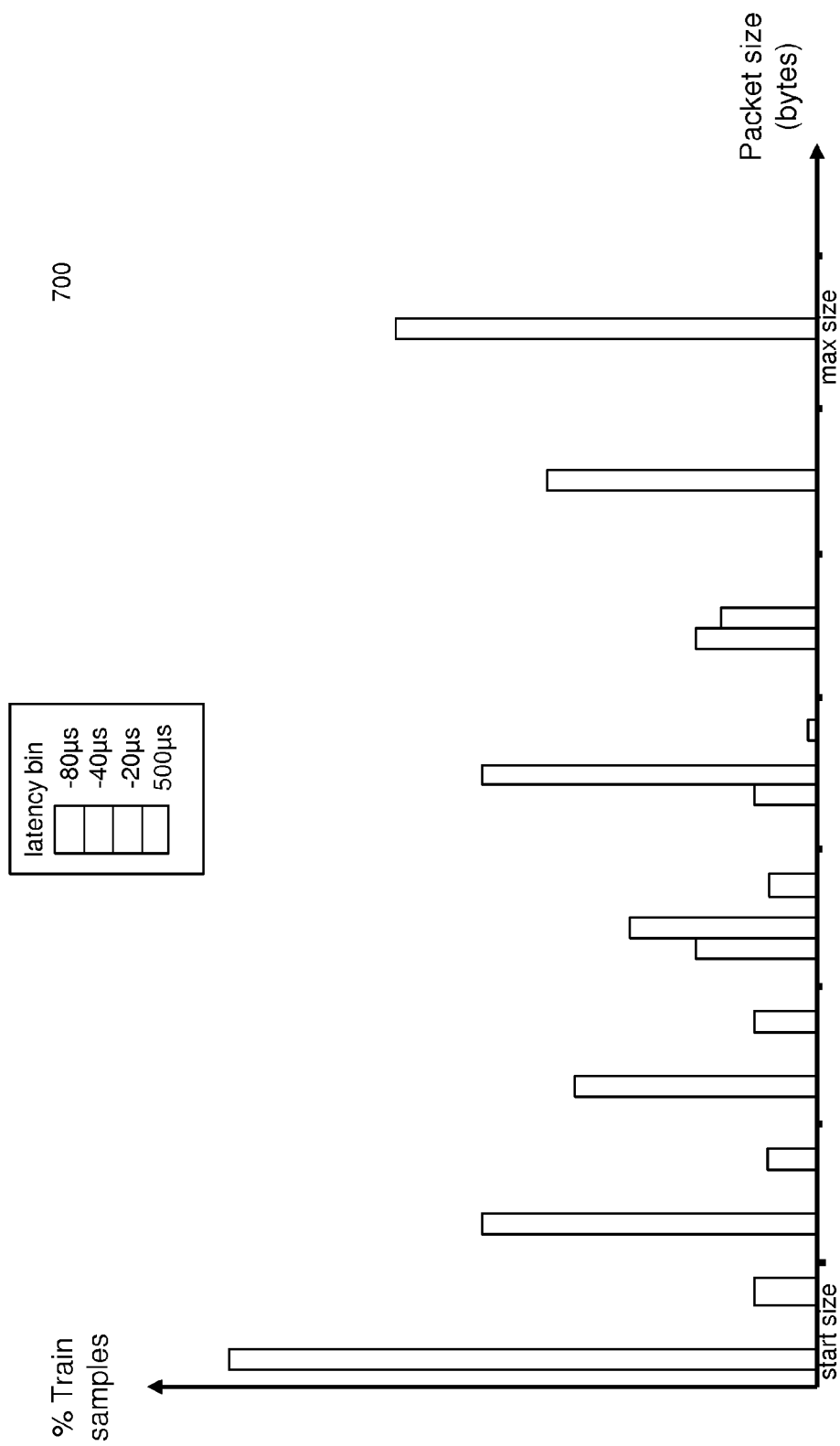
FIG. 7 is a plot of the latency distribution for various packet sizes for an example powerline link.

FIG. 7 illustrates the latency distribution for a HomePlug AV adapter, which is a type of Powerline connection. Again the distribution has been simplified. A distinctive pattern is present with this distribution, with hits starting in the −80 μs bin, and moving into −40 μs bin, and then −20 μs bin as the load increases.

In step 414, pattern matching can be applied by the control module 208 to compare the determined latency distribution with predetermined distributions that represent known network connectivity technologies to identify the network technology used in the network link.

Resolving the network technology from the distributions requires employing one or more pattern matching techniques on the determined distribution compared to predetermined or pre-modelled distributions of known network connectivity technologies. For technologies with strong features in their distributions, this may be relatively simple. For example, the prototype used a scheme that identified G·hn power-line. The scheme used a feature of this technology that showed consistent use of the 500 μs bin with greater than 10% of total samples across all loading cycles. This is combined with 50% of the total samples usage for the −90 μs bin for the lower half of the load cycle, shifting to −80 μs for the upper half of the cycle.

The range of pattern matching techniques revolves around the respective fingerprints/distributions of a number of network technologies/devices being identified combined with the uniqueness of their. For a service provider trying to determine if Ethernet or power-line is being used, identifying that 90% of samples are in the 0 μs bin is all that is required to determine the technology as Ethernet. However, a service provider exposed to a large range of technologies may need to use more complex techniques that analyse sample points across the entire load cycle using Bayesian or Markov techniques.

The general approach of identifying the network connectivity technology used in a network link described above can be initiated as required. For example, the method may be initiated periodically (once a week) and the results maintained in a database by the service provider. The identity of the technology can then be used at any time by inspecting the database. Alternatively, the method can be initiated on demand, for example when a customer reports a fault with a service, and the results from the method used for troubleshooting the fault. In a third approach, the method can be triggered as a result of a continuous monitoring of the line, where the monitoring indicates some change in the network characteristics.

Whilst the control module 208 has been shown as residing in the CPE, in alternative examples, it can be located outside the CPE and in some other part of the network. Thus, the transmitter unit 210 and receiver unit 212 can send its results to a separately located control module 208 for processing and network identification.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of identifying a data transmission technology used in a network link between a first node and a second node, said method comprising:
   transmitting a first set of data packets from the first node to the second node over the network link, and receiving the first set of data packets at the second node, wherein the first set of data packets comprises a plurality of data packets of a first size, and the plurality of data packets are transmitted with a fixed transmitted inter-packet gap;
   calculating latency values associated with the first set of data packets, wherein each latency value is equal to the difference in the received inter-packet gap of the data packet and the fixed transmitted inter-packet gap;
   repeating the transmitting and calculating steps with a second set of data packets, wherein the second set of data packets comprises a plurality of data packets of a second size, and wherein the second size is different to the first size;
   generating a fingerprint for the network link comprising a distribution of latency values for each packet size;
   comparing the generated fingerprint with a plurality of predetermined fingerprints to determine the data transmission technology used in the network link, wherein each predetermined fingerprint corresponds to data transmission technology type.

2. A method according to claim 1, wherein the latency values are grouped into latency bins, where each latency bin covers a range of latency values, and the fingerprint comprises a distribution of latency values grouped into latency bins for each packet size.

3. A method according to claim 1, wherein the repeating step is further repeated with a plurality of sets of packets, each set comprising data packets of a size different to a previously used size.

4. A method according to claim 3, wherein the plurality of sets of packets increase in packet size starting from the first set.

5. A method according to claim 3, wherein the number of sets of packets used is dependent on a dispersion measure associated with the network link, where the dispersion measure is a relative measure of the overall load on a link.

6. A method according to claim 1, wherein the comparing step comprises using pattern matching techniques.

7. A system for identifying a data transmission technology used in a network link between a transmitting node and a receiving node, said system comprising:
   a transmitting node adapted to transmit a first set of data packets to a receiving node over a network link, wherein the first set of data packets comprises a plurality of data packets of a first size, and the plurality of data packets are transmitted with a fixed transmitted inter-packet gap;
   a receiving node adapted to receive the first set of data packets;
   a control module adapted to calculate latency values associated with the first set of data packets, wherein each latency value is equal to the difference in the received inter-packet gap of the data packet and the fixed transmitted inter-packet gap; and wherein
   the transmitting node is further adapted to transmit a second set of data packets, wherein the second set of data packets comprises a plurality of data packets of a second size, and wherein the second size is different to the first size; and
   the control module is further adapted to a calculate latency values associated with the second set of data packets, generate a fingerprint for the network link comprising a distribution of latency values for each packet size, and compare the generated fingerprint with a plurality of predetermined fingerprints to determine the data transmission technology used in the network link, wherein each predetermined fingerprint corresponds to data transmission technology type.

* * * * *